March 4, 1952  R. RIDGELY  2,588,046
COOKING DEVICE

Filed May 27, 1946  7 Sheets-Sheet 1

INVENTOR.
RICHARD RIDGELY
BY

ATTORNEY

March 4, 1952  R. RIDGELY  2,588,046
COOKING DEVICE
Filed May 27, 1946  7 Sheets-Sheet 2

Fig. 2

INVENTOR.
RICHARD RIDGELY.
BY
ATTORNEY

March 4, 1952 R. RIDGELY 2,588,046
COOKING DEVICE
Filed May 27, 1946 7 Sheets-Sheet 3

INVENTOR.
RICHARD RIDGELY

March 4, 1952 R. RIDGELY 2,588,046
COOKING DEVICE
Filed May 27, 1946 7 Sheets-Sheet 4

INVENTOR.
RICHARD RIDGELY
BY
ATTORNEY

March 4, 1952  R. RIDGELY  2,588,046
COOKING DEVICE

Filed May 27, 1946  7 Sheets-Sheet 6

INVENTOR
RICHARD RIDGELY
BY
ATTORNEY

March 4, 1952 R. RIDGELY 2,588,046
COOKING DEVICE
Filed May 27, 1946 7 Sheets-Sheet 7

INVENTOR.
RICHARD RIDGELY
BY
ATTORNEY

Patented Mar. 4, 1952

2,588,046

UNITED STATES PATENT OFFICE 2,588,046

COOKING DEVICE

Richard Ridgely, Bayside, N. Y.

Application May 27, 1946, Serial No. 672,507

5 Claims. (Cl. 99—421)

This invention relates to improvements in rotisseries, ovens and broilers, and combinations thereof.

It is one of the objects of the present invention to provide efficient, economical and novel cooking means embodying practical constructions and operation and requiring a minimum of attention on the part of the operator.

It is a further object of the present invention to provide roasters and broilers of improved construction and operation wherein means are provided for imparting to the fowl and meats to be roasted or broiled, a high degree of heat free from smoke and flame and by means of which the broiling or roasting of fowl and meats may be rapidly and effectively accomplished.

A still further object of the present invention resides in providing an attachment for a cooking range or stove so that meat and fowl may be barbecued or roasted while the spit associated with the attachment is continuously revolved in the heat zone.

Yet another object of the present invention resides in providing a cooking oven utilizing charcoal as the combustible agent deriving its heat from a gas burner or electric heating element and further utilizing means for blowing and conducting air over and above the charcoal.

A further object of the present invention is to provide a spit supporting unit having spit-rotating mechanism and which may be slid into a cooking cabinet or stove in position to enable the spit-rotating mechanism to be operatively connected to driving mechanism in the cabinet, the unit preferably being adapted to operatively support a plurality of spits to be rotated; a still further object being to provide novel spit-retaining means in the unit.

Another object of the present invention is to provide a meat-holding spit with a gear to enable it to be operatively connected to spit-rotating mechanism.

Still another object of the present invention is to provide a cooking cabinet or stove with driving mechanism, and optionally with swinging door or sliding drawer, or both, carrying spit-supporting means, and spit-rotating means operatively connecting with the driving mechanism when the door is swung or the drawer retracted to closed position for rotating the spit.

A further object of the present invention is to provide a door of a range or stove with spit-supporting means: other objects being in making said means adjustable, removable or collapsible, and in further providing heating-reflecting means adjacent the spit-supporting means; and in further providing means for rotating the spit.

Another object of the present invention is to equip a domestic cooking range with spit-supporting means and means for rotating the spit.

Another object of the present invention resides in providing units for the broiler and roasting compartments of a domestic cooking range for effectively and efficiently roasting fowl and meat, the unit for the broiler compartment providing air-blowing means connectable to the unit in the roasting compartment which latter unit is arranged to be located above the gas burner or electric heating element and comprising a holder for charcoal and air ducts for directing the blown air over and above the charcoal, an important feature of the said units being the fact that they may be applied and removed very easily, thus permitting the use of the broiler and roaster compartments in the conventional way for ordinary broiling, toasting, etc., the entire units being removable.

It is yet another object of the present invention to enable anyone owning a domestic cooking range to use charcoal for roasting fish, fowl and meats, thereby imparting to that food being roasted the delightful aromatic flavor and characteristic taste that can only be produced by a charcoal fire.

Other objects and advantages will be in part obvious from the annexed drawings and in part hereinafter indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the modifications in structure and relation contemplated by this invention, drawings depicting certain forms of the invention have been annexed as a part of this disclosure, and in such drawings, like characters of reference denote corresponding parts throughout all the views, of which—

Figure 1:
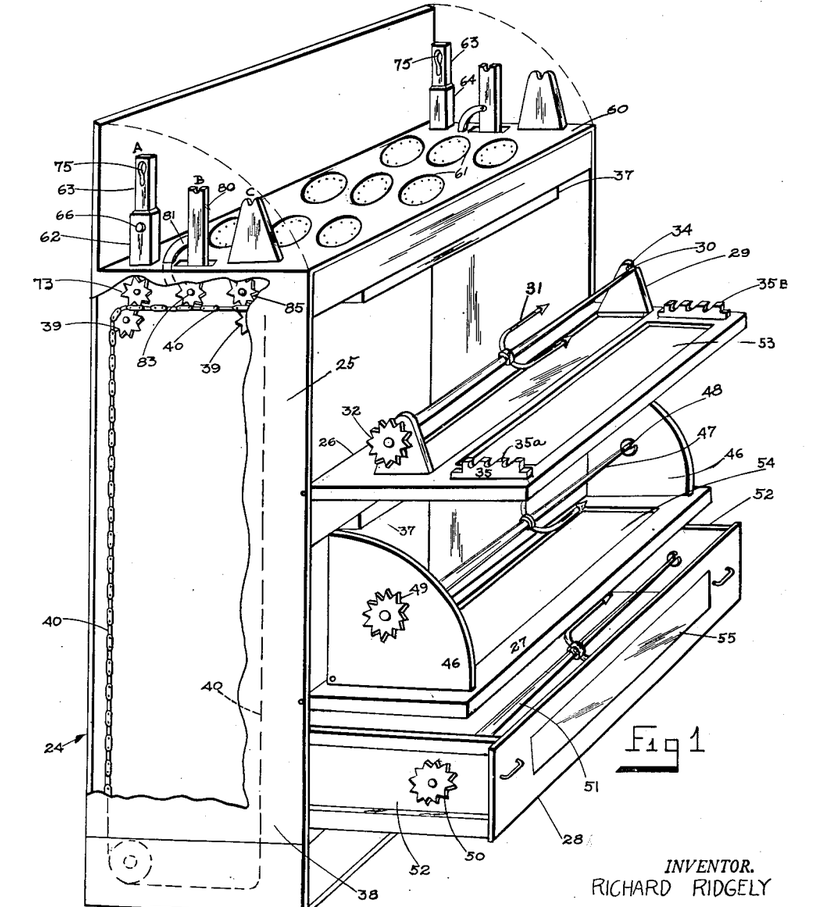
Fig. 1 is a perspective view of a device incorporating a plurality of features embodied in the invention.
Figures 7, 9, 10:
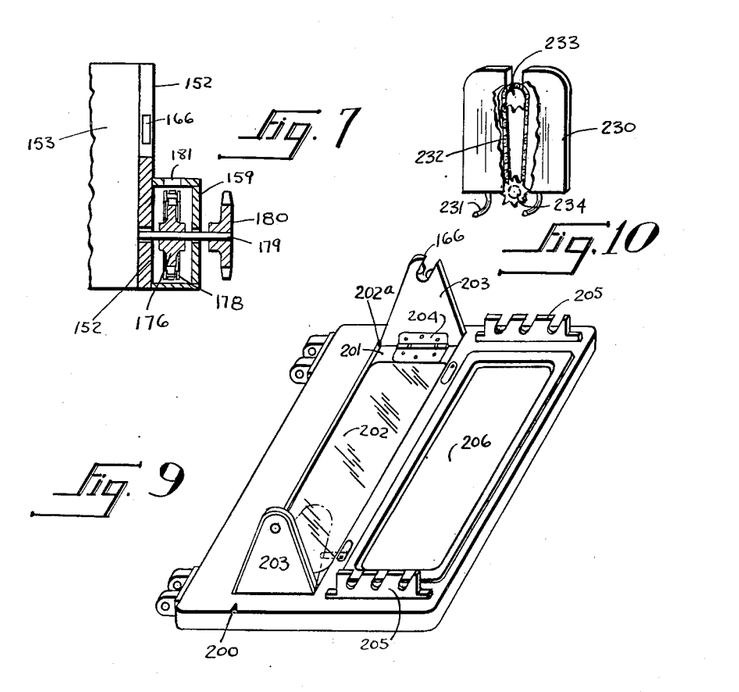
Fig. 7 is a sectional view taken through line 7—7 of Fig. 3.
Fig. 9 is a perspective view of a door arrangement including spit-holding device and which is employable with either Fig. 1 or Fig. 2.
Fig. 10 is a perspective view of a removable spit holder employable in connection with Fig. 1.

Referring now more particularly to the drawings, there is disclosed in Fig. 1 a diagrammatic representation of a stove 24, embodying several features of the invention. These features may be used together, separately or in any desired combination. Attached to body 25 is a swingable door 26, below which is another swingable door 27, and below door 27 is a drawer 28. Mounted on door 26 are a pair of spaced uprights or supports 29 adapted to receive the spit 30. Spit 30 has the usual prongs 31. Supports 29 may be either swingably connected to door 26 as seen in Fig. 9 or may be made removable therefrom similarly to that depicted in the support seen in Fig. 10.

Rotatably mounted on one of the supports 29 is a gear 32. Gear 32 has a hollow stub shaft 33 receiving one end of spit 30, the other end of spit 30 being receivable through a slot 34 in the other support 29. Shaft 33 has a set screw 33a to hold one end of spit 30 therein.

There may also be arranged on door 26 a rack 35 adapted to receive a plurality of spits (not shown), a tray 36 being disposed between the rack bars 35a, 35b.

Horizontally disposed in spaced relation are the heating units 37, which may be electrical or gas operated.

On one of the vertical side panels 38 are rotatably arranged in spaced relation idler gears 39 over which is trained a sprocket chain 40. Motion is transmitted to chain 40 through a motor not seen in Fig. 1, but similar to motor 117 of Fig. 2. It is evident that when door 26 is closed, gear 32 will engage sprocket chain 40 and thereby rotate causing rotation of spit 30 in supports 29.

Figure 1A:
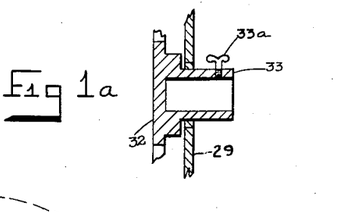
Fig. 1a is a sectional view of a detail seen in Fig. 1.

Mounted on door 27 are the spaced side walls 46 which also serve as spit supports. Gear 49 is mounted on one of the supports 46. Spit 47 has one of its ends received in a U bushing 48 in the other support 46, the other end of spit 47 being connected to a hollow stub shaft of gear 49. Gear 49 and its hollow stub shaft as well as gear 50 and its hollow stub shaft are of the same construction as that depicted in Fig. 1a with respect to gear 32 and its hollow shaft 33.

When door 27 is swung to closed position, gear 49 will engage sprocket chain 40.

Spit 51 is mounted on the side walls 52 of drawer 28 in a manner similar to the spits 30 and 47 hereinbefore mentioned. It is evident that when drawer 28 is slid to closed position gear 50 will engage sprocket chain 40. The doors 26 and 27 and drawer 28 may be provided with the front transparent panels 53, 54, 55, respectively.

The top 60 of the stove (Fig. 1) is provided with the plurality of conventional burners 61. For representative purposes there are shown a plurality of spit-supporting arrangements A, B, and C, respectively. One of the supports A is shown in detail in Fig. 15. Support A comprises two telescoping members 62, 63. Member 63 is provided with a plurality of spaced holes 64, anyone of which may be engaged by the pin 65 having a head 66; pin 65 being operable on member 62. Member 62 is fixed on top 60. Top 60 has heat insulation 67 and brackets 68 to securely hold members 62 to top 60.

Figure 15:
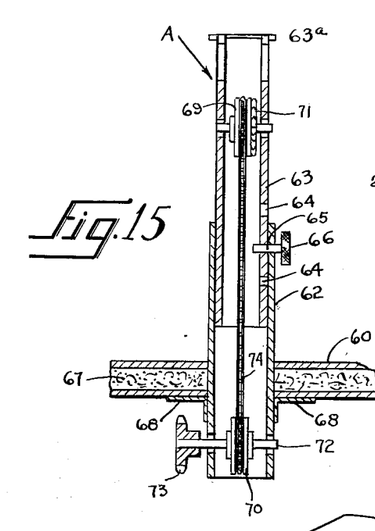
Fig. 15 is a detail sectional view of the spit holder A of Fig. 1.

Referring to Figs. 1 and 15 it is to be understood that the entire housing or spit support A may be made to completely retract within the stove so that the flange 63a is made substantially flush with the top 60 of the stove.

It is evident that vertical height adjustment may be readily made by withdrawing pin 65, raising or lowering member 63 with relation to member 62, and then inserting pin 65 in a suitable hole 64.

Mounted on member 63 is friction wheel 69 and mounted on member 62 is a friction wheel 70. Adjacent wheel 69 is a gear 71, and on shaft 72 on which wheel 70 is mounted is a gear 73. Trained over wheels 69 and 70 is a spring belt 74. Gear 73 engages sprocket chain 40. Spring belt 74 allows for the raising and lowering of member 63, as desired.

Figure 8:
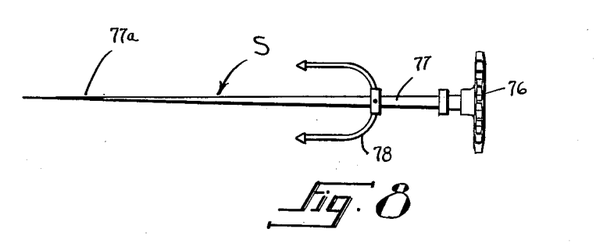
Fig. 8 is a plan view of a spit.

The support members 63 have the keyhole shaped openings 75 for receiving the ends of the spit. The spit, one form of which is seen in Fig. 8 has a gear 76 at one end of its shaft 77 and is provided with the prongs 78. Shaft 77 may be tapered at its other end. Gear 76 is adapted to engage sprocket chain 74 (Fig. 15) to be driven thereby.

Figures 18, 19:
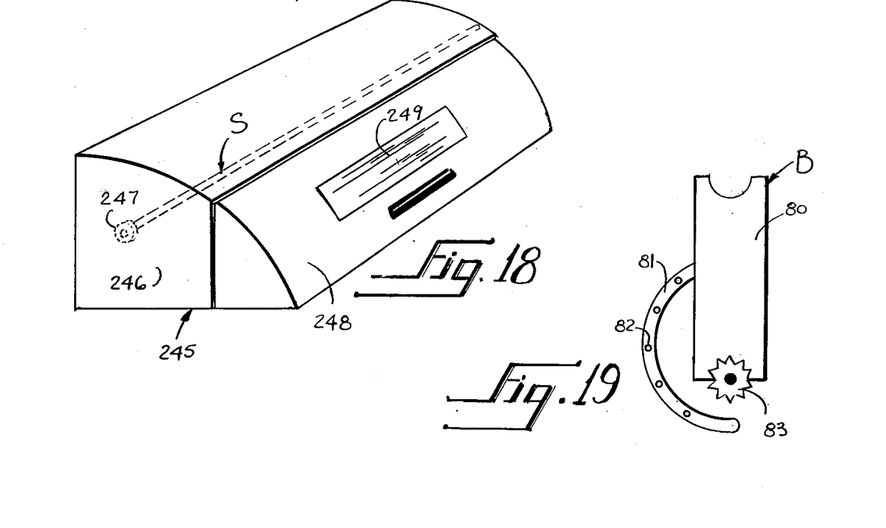
Fig. 18 is a perspective view of a spit container employable as a separate unit placeable on a conventional stove or as an integral part of said stove.
Fig. 19 is an elevational view of the spit support B of Fig. 1.

As heretofore stated the stove 24 may be provided with the spaced spit supports B shown in greater detail in Fig. 19. The support 80 is arranged to swing in either direction (frontward or rearward) relatively to the top of the stove by means of curved bracket 81 slidable in an opening in the stove. Suitable spring or other means (not shown) may be provided to engage the perforations 82 to maintain the bracket 81 in any desired position. The purpose of providing for this front and rearward swinging movement of the spit supports B is to allow the spit supported by members 80 to be brought over any one of the longitudinal rows of the burners 61. Of course, if the spit supports B are employed, then, the spit supports A and C are eliminated. The spit driving mechanism may be similar to that employed in connection with the supports A, in which case, there will be provided elements equivalent to 69 to 74, inclusive, of Fig. 15; the gear 73 of Fig. 15 becoming the gear 83 of Fig. 1 engaging the sprocket chain 40.

The spit supports C may be fixed or hinged to or removable from the top of the stove 24 and may be provided with elements similar to 69 to 74, inclusive, of Fig. 15; the gear 73 of Fig. 15 becoming the gear 85 of Fig. 1 engaging the sprocket chain 40.

Figure 2:
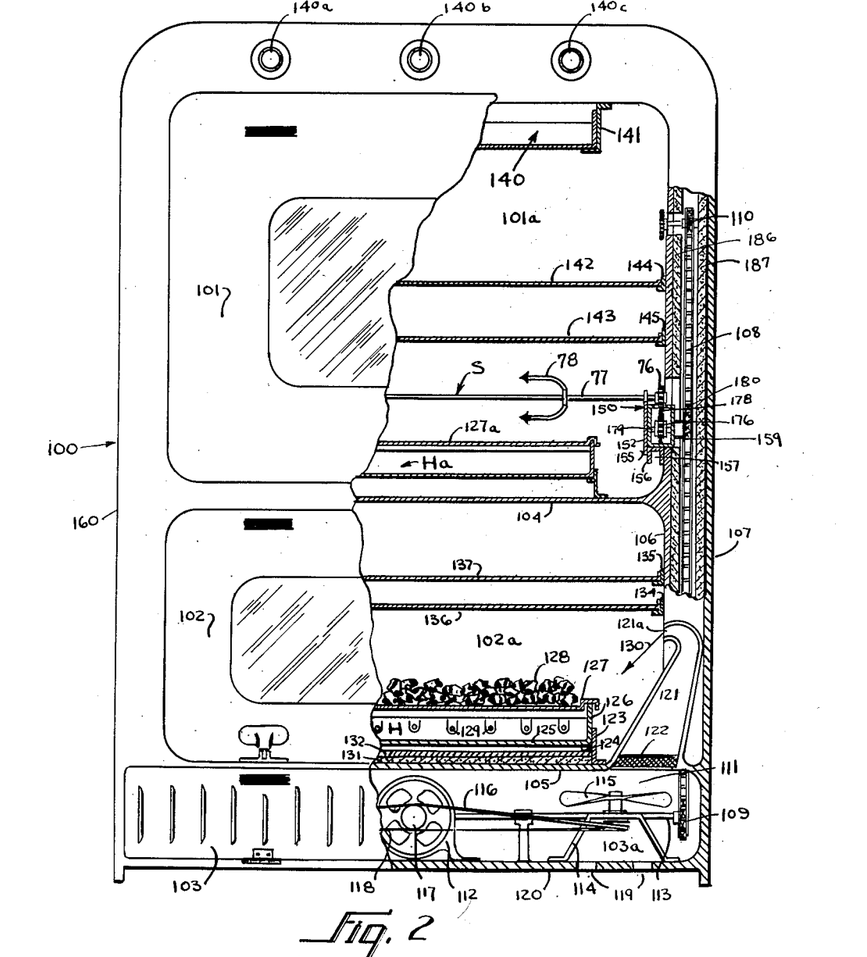
Fig. 2 is a front view partly in section showing somewhat in detail, some of the features embodied in Fig. 1 as well as additional features.

Referring now to Fig. 2 of the drawings and the details shown in Figs. 3 to 8, inclusive, there is disclosed a cabinet 100 having hinged front doors 101, 102, 103; and horizontal shelves or partitions 104, 105. There is also a vertical partition or wall 106 spaced from the exterior wall 107 providing a compartment housing the sprocket chain 108 trained over sprocket gears 109, 110. In the bottom compartment 111 is located the gear 109 and also motor 112 driving shaft 113 to which gear 109 is connected; bracket 114 rotatably supporting fan 115 driven by belt 116 trained over pulley 117 of motor 112. Belt 118 trained over the same pulley 117 operates a fan (not shown) similar to fan 115 and located to the left of motor 112 in compartment 103a. Air inlets or vents 119 are provided through bottom 120. An air duct 121 directs air from compartment 103a to compartment 102q, a filter screen 122 being provided. Air duct 121 has its outlet 121a adjacent the top of charcoal 128.

In compartment 102a there are provided spaced guide walls 123 each having a horizontal flange 124 adapted to slidingly receive a heating unit H comprising a grill pan 125, the side walls 126 of which support a plate 127 adapted to receive charcoal 128 or other combustible agent. Plate 127 is arranged to slidingly engage the said walls 126. Within pan 125 is located any desirable heating agent, gas or electric. Numeral 129 indicates either the electric coils or gas burners. Air duct 121 extends above the pan 125 and charcoal holding plate 127, so that air entering through inlets 119 will be driven by fan 115 through filter 122 and air duct 121 and directed above the charcoal 128 to support combustion thereof, as indicated by the arrow 130. It is understood that a similar air duct (not seen) may be provided to the left of compartment 102a.

Above partition 105 there is provided suitable heat insulation 131, and above the latter is provided a heat reflector plate 132 so that the heat impinging upon plate 132 may be reflected upwardly. Also in compartment 102a may be provided pairs of side guide flanges 134, 135, respectively slidingly receiving conventional grills 136, 137.

Supported on partition plate 104 is a heating unit Ha similar to the unit H described with reference to compartment 102a. Charcoal may be placed on plate 127a. At the top of compartment 101a may be provided another heating unit 140 which may be operated electrically or by gas. Guide brackets 141 slidingly support this unit 140. Grills 142, 143, are respectively slidingly received on guide flanges 144, 145.

Figure 3:
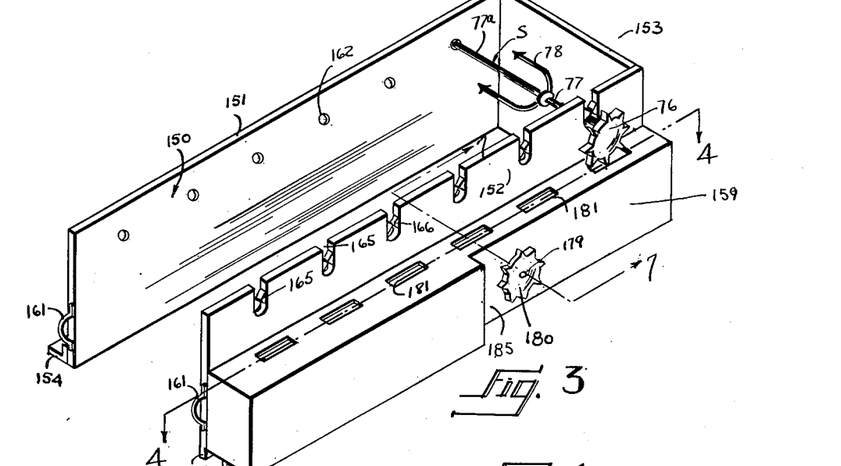
Fig. 3 is a perspective view of a tray having a multiple of spits employable with the device seen in Fig. 2.
Figure 4:
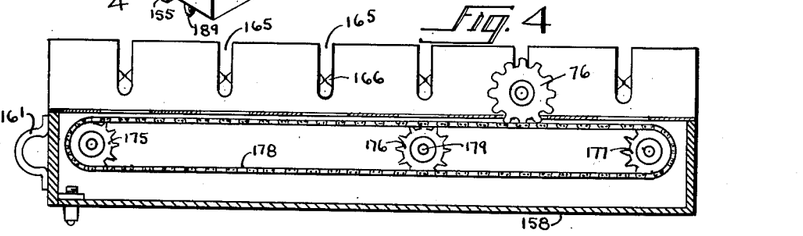
Fig. 4 is a sectional view taken through line 4—4 of Fig. 3.

Slidably received in compartment 101a is a spit holder which may be of the type seen in Figs. 3 and 4. This spit is placed and removed from compartment 101a by first swinging open door 101.

Referring to Figs. 3 and 4, there is provided a substantially box-like frame 150 having side walls 151, 152 connected by a rear wall 153. Side wall 151 is provided with a horizontal flange 154 and side wall 152 has a projection 155.

Projection 155 slidingly engages the vertical inside wall 156 of horizontal guide channel bracket 157, the bottom 158 of box-like structure 159 being slidingly supported on the top of bracket 157. Flange 154 is slidingly supported on a similar bracket (not seen) located adjacent the side wall 160 of cabinet or broiler 100. Handles 161 are provided for inserting and removing unit 150.

Wall 151 is provided with a plurality of spaced holes 162 each of which is adapted for receiving one end 77a of shaft 77 of spit S. The spit is illustrated in Fig. 8 and is also seen in Figs. 2 and 3.

Figure 5:
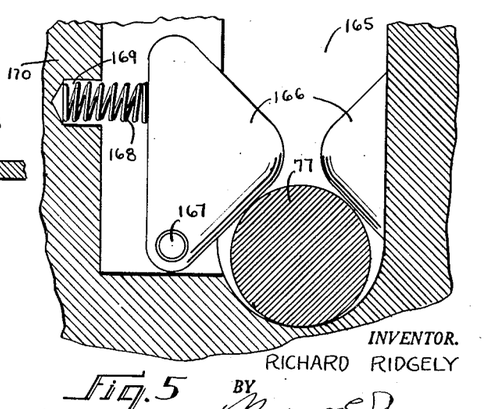
Fig. 5 is a detail sectional view of the portion of Fig. 4 for holding the spit in place.

Wall 152 is provided with the spaced recesses 165 in each of which are pivotally connected spaced apart triangularly-shaped spit retainers 166 normally urged outwardly by compression spring 168, one end of which is received in recess 169 of wall 170. It is evident that when the shaft 77 of spit S is pressed against the retainers 166, the later will spread apart against the compression of springs 168 and allow shaft 77 to pass therebetween and be blocked by retainers 166.

Box-like structure or casing 159 contains the rotatably mounted spaced sprocket gears 175, 176, 177 over which is trained the sprocket chain 178. Mounted on shaft 179 of sprocket 176 is the gear 180. Casing 159 is provided with a plurality of openings 181, each of said openings being adjacent a recess 165 and adapted to receive teeth of gear 76 connected to spit S. It is evident that when spit S is positioned in frame 150, gear 76 will engage sprocket chain 178 through opening 181; and when frame 150 is slid into compartment 101a, gear 180 will engage sprocket chain 108 (Fig. 2). Motion of sprocket chain 108 will be imparted to gear 180, sprocket chain 178 and gear 76, thereby rotating spit S.

Casing 159 is reduced as indicated at 185 to permit engagement of gear 180 with sprocket chain 108. Broiler or cabinet 100 is provided with conventional heat insulation 186, 187, and the motor, thermostat and electric heater controls 140a, 140b and 140c respectively.

Figure 6:
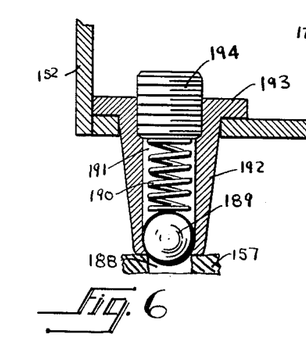
Fig. 6 is a sectional view of a ball lock employable in the invention.

A longitudinal groove 186 is provided in channel guide 157 providing a track for ball 189 urged in an outward direction by spring 190 located in recess 191. Ball 189 is prevented from falling out of recess 191 by the inturned wall 192 of socket 193 fixed to box 159. Ball 189 and spring 190 are retained in socket 193 by threaded cap 194. The device depicted in Figs. 3 and 4 may be permanently attached in cabinet 100 instead of being removable.

Figure 11:
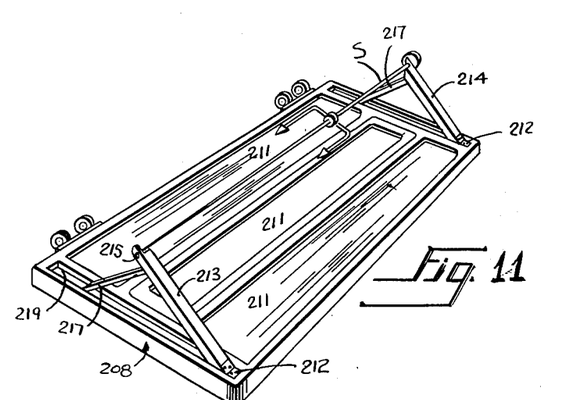
Fig. 11 is a perspective view of a modified form of spit-holding arrangement.
Figure 13:
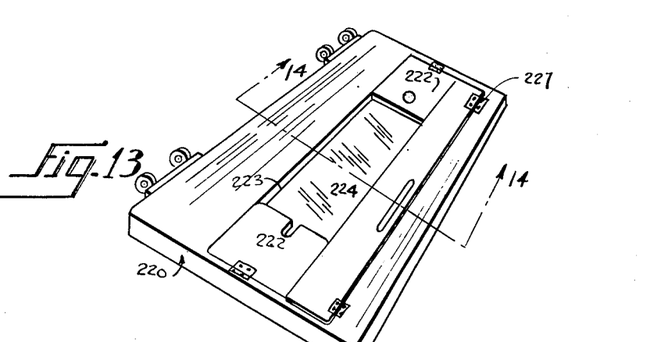
Fig. 13 is a perspective view of a further modified form of spit-holding arrangement.

Door 101 may be any one of the types depicted in Figs. 9, 11 and 13. In Fig. 9, door 200 has recess 201 provided with a heat reflector 202. At the ends of recess 201 are provided the spit supports 203 hinged as indicated at 204. Supports 203 may be swung down within recess 201 when not in use. Supports 203 are provided with the retainer elements, 166. There also may be provided on door 200, a spit rack comprising the slotted members 205, the door between said rack being depressed as indicated at 206 providing a trap for grease and other drippings from food placed on the spit, while being broiled, a gutter 202a being provided at bottom of trap.

Figure 12:
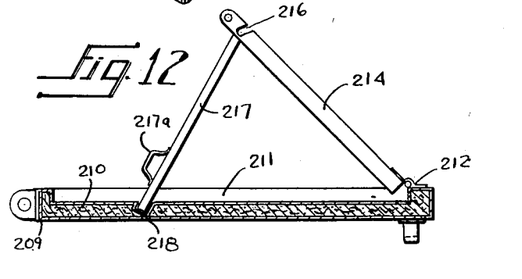
Fig. 12 is a sectional view of Fig. 11.

The door illustrated in Figs. 11 and 12 generally indicated by the numeral 208 comprises the plate 209 having heat insulation 210 and being provided with the plurality of longitudinal depressions 211 for trapping grease and other drippings. Hingedly secured as indicated at 212 is a pair of spaced spit-carrying arms, 213, 214, the former having a hole 215 and the latter having a slot 216 for receiving the spit S. Pivotally connected to each of the arms 213, 214, is a supporting leg 217, the free end of which is adapted to be received in a recess 218 whereby to operatively support the spit-carrying arms 213, 214. When in inoperative position, the arms 213, 214 and legs 217 are received in the transverse grooves 219. Legs 217 are provided with handles 217a or they may be eliminated as desired.

Figure 14:
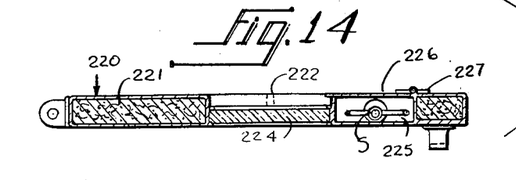
Fig. 14 is a sectional view taken on line 14—14 of Fig. 13.

According to Figs. 13, and 14, the door 220 which is heat insulated as indicated at 221, is provided with the spaced hinged spit supports 222, receivable in the depression 223 when said supports are in inoperable position. Depression 223 is provided with the heat reflector 224. A longitudinal pocket or cavity 225 is provided for receiving the spit S when not in use. A cover 226 is provided for pocket 225. Cover 226 may be hinged as indicated at 227 or it may be arranged to slide relatively to door 220.

Fig. 10 illustrates a type of removable spit support 230 which may be employed, for example, in lieu of the supports C of Fig. 1. Support 230 is provided with the brace or bracket pins 231 adapted to be received in suitable openings in the stove or broiler for use and disengaged therefrom for storage purposes. Support 230 is provided with a sprocket chain 232 trained over gears 233, 234. Gear 234 is arranged to mesh with gear 85 (Fig. 1) when support 230 is placed in operative position; and gear 76 of spit S is engageable with the sprocket chain 232 when the spit is positioned on the supports.

Figure 16:
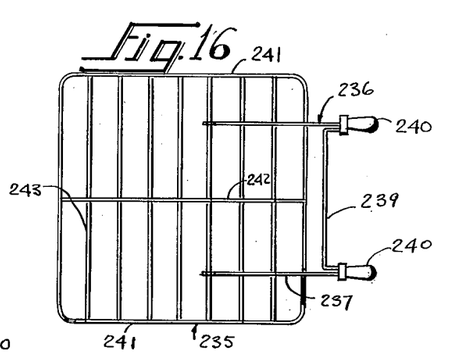
Fig. 16 is a plan view of a grid and grid holder employable in the invention.
Figure 17:
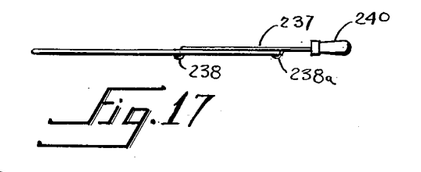
Fig. 17 is a side view of Fig. 16.

Figs. 16 and 17 illustrate a type of grill 235 for which is provided removable handle means 236, comprising the arms 237 having hooked ends 238 and hooks 238a adapted to engage the grill, the cross bar 239 and hand grips 240. It is evident that handle means 236 may be made to grip the cross member 242 of the grill at which time the arms 237 will be supported by one of the sides 241; or the arms 237 may be modified to grip appropriate cross members 243.

Fig. 18 illustrates a type of portable broiler 245, which may be placed on top of a conventional stove. The spit S is removably and rotatably supported by the ends 246, to the shaft of which is connected a gear 247 externally of one of the ends 246. Gear 247 may be connected to any suitable driving means (not shown). A door 248 having a window 249 is provided.

Figures 21, 22:
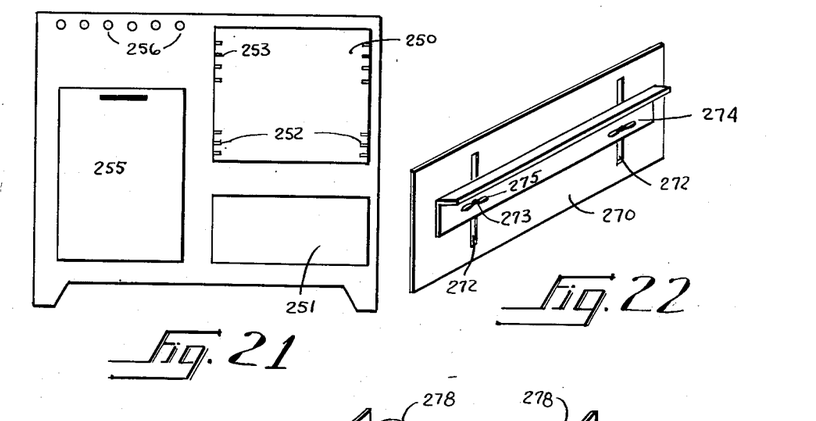
Fig. 21 is a diagrammatic view of a conventional stove in which the assembly of Fig. 20 may be received.
Fig. 22 is a perspective view of a wall with adjustable feature shown also in Fig. 20.

Fig. 21 represents a gas or electric cabinet-type range having an upper compartment 250 and a lower compartment 251. Upper compartment 250 has the side guide flanges 253 for supporting trays or grills and 252 for supporting the heating unit 254 as more specifically described later on. The range may have the conventional storage compartment 255 and gas controls 256.

The compartment 250 is usually designated as the oven and the compartment 251 as the broiler. Between the two compartments 250 and 251 is located the burner, either gas or electric, and above the burner is located a removable tray. The burner and tray being conventional, they are omitted from the drawing.

Figure 20:
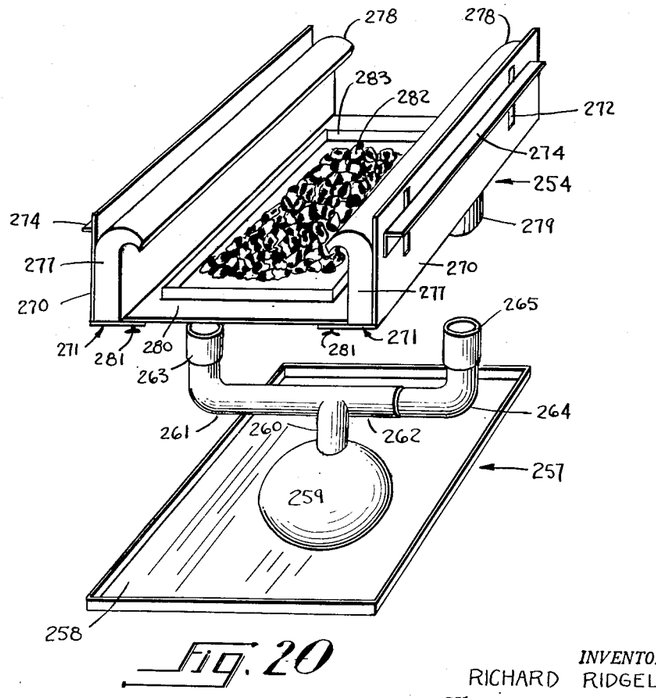
Fig. 20 is a perspective view of a heating assembly employable in the invention.

The device illustrated in Fig. 20 comprises the units 254 and 257. Unit 257 comprises a base plate or frame 258 to which is secured a housing 259 for a blower motor (not seen). A conduit 260 extends from housing 259 to which is connected the conduit arms 261, 262. Arm 261 extends upwardly and has a slidable sleeve 263. Slidably connected to arm 262 is an L-shaped conduit 264 terminating in a slidable sleeve 265. Unit 257 is placed in compartment 251, and unit 254 is placed in compartment 250. The conventional horizontal partition between compartment 250 and 251 is removed. Unit 254 is supported by opposite guide flanges 252, for which purpose there is provided on the walls 270 of angular supports 271, vertical slots 272 slidably receiving bolts 273 engaging angular flanges 274. Bolts 273 threadedly engage wing nuts 275. It is evident that flanges 274 may be raised or lowered relatively to walls 270 and fixed relatively thereto by tightening the winged nuts, for the purpose of being supported by the flanges 252 in compartment 250 to maintain the supports 271 at the desired height. Secured to each support 271 is a longitudinal air duct 277 having its upper end projecting inwardly as indicated at 278. Each air duct 277 has connected thereto a nipple 279. Seated on the horizontal portions of supports 271 is a pan or plate 280. Pan 280 may be secured to supports 271 by means of bolts and wing nuts 281. Supports 270 may be spread further apart or brought closer together relatively to pan 280 by a slot arrangement similar to that shown in Fig. 22 relatively to flange 274, this being provided in order to fit unit 254 in compartment 250 with the flanges 274 in supporting engagement with flanges 252, allowing for width variations of compartment 250 in different sizes or makes of ranges. The charcoal 282 may be placed directly on plate 280 or in a separate pan or container 283.

After unit 254 is placed in compartment 250 and unit 257 is placed in compartment 251, sleeves 263, 265 are made to slide over the ends of nipples 279 thereby providing continuous closed passages for air to be blown from the housing 259 through air ducts 277 above onto and over the burning charcoal 282. The charcoal is made combustible by means of the burner in the range and located between compartments 250, 251. Air vents are provided in base 258 below housing 259.

It is to be particularly observed that in the heating units shown in Fig. 2 and Fig. 20, air is provided above and over the burning charcoal. It is also to be noticed that the charcoal is supported on a solid plate or pan in preference to a perforated plate or grill.

From the foregoing description taken in connection with the accompanying drawings, it is apparent that improved simple, practical and inexpensive devices for the purpose intended are provided. It is apparent however, that immaterial changes and modifications may be made by skilled persons without departing from the true spirit and scope of the invention as outlined in the appended claims.

Having thus described my invention, what I claim as new and desire to secure by Letters Patent is:

1. In a cooking device, a cabinet, a door for said cabinet, driving means in said cabinet, a spit member, spit supporting means on said door, and spit rotating means connectable to said driving means when the door is closed.

2. In a cooking device, a cabinet, a door for said cabinet, driving means in said cabinet, a spit member, spit supporting means on said door, spit rotating means connectable to said driving means when the door is closed, and heat reflecting means on the inside of said door.

3. In a cooking device, a cabinet, a door for said cabinet, driving means in said cabinet, a spit member, adjustable spit supporting means on said door, and spit rotating means connectable to said driving means when the door is closed.

4. In a cooking device, a cabinet, a door for said cabinet, driving means in said cabinet, a spit member, removable spit supporting means on said door, and spit rotating means connectable to said driving means when the door is closed.

5. In a cooking device, a cabinet, a door for said cabinet, driving means in said cabinet, a spit member, collapsible spit supporting means on said door, and spit rotating means connectable to said driving means when the door is closed.

RICHARD RIDGELY.

REFERENCES CITED

The following references are of record in the file of this patent:

UNITED STATES PATENTS

| Number | Name | Date |
|---|---|---|
| 902,724 | Giovanna | Nov. 3, 1908 |
| 1,010,327 | Trescott | Nov. 28, 1911 |
| 1,085,671 | Day | Feb. 3, 1914 |
| 1,133,888 | Schwenger | Mar. 30, 1915 |
| 1,425,501 | Maul | Aug. 8, 1922 |
| 1,442,584 | Schey | Jan. 16, 1923 |
| 1,747,325 | Schey | Feb. 18, 1930 |
| 1,861,689 | Dibble | June 7, 1932 |
| 2,012,811 | Duffy | Aug. 27, 1935 |
| 2,059,666 | Thompson | Nov. 3, 1936 |
| 2,114,697 | Babin | Apr. 19, 1938 |
| 2,143,994 | McGlove | Jan. 17, 1939 |
| 2,192,732 | Johnson | Mar. 5, 1940 |
| 2,225,861 | Dufour | Dec. 24, 1940 |
| 2,241,754 | Wilsey | May 13, 1941 |
| 2,262,910 | Aller | Nov. 18, 1941 |
| 2,348,545 | Kahn | May 9, 1944 |
| 2,379,239 | Krebs | June 26, 1945 |

FOREIGN PATENTS

| Number | Country | Date |
|---|---|---|
| 784,267 | France | July 22, 1935 |